United States Patent
Sanai et al.

(10) Patent No.: US 7,386,731 B2
(45) Date of Patent: Jun. 10, 2008

(54) PASSWORD INPUT TABLE CREATING METHOD AND APPARATUS AND PROGRAM THEREOF

(75) Inventors: Daiji Sanai, Kanagawa (JP); Michiharu Arimoto, Kanagawa (JP)

(73) Assignee: Yamatake Corporation, Tokyo (JP)

( * ) Notice: Subject to any disclaimer, the term of this patent is extended or adjusted under 35 U.S.C. 154(b) by 930 days.

(21) Appl. No.: 10/750,844

(22) Filed: Jan. 5, 2004

(65) Prior Publication Data
US 2004/0139331 A1 Jul. 15, 2004

(30) Foreign Application Priority Data
Jan. 9, 2003 (JP) ............................. 2003-002849
Mar. 27, 2003 (JP) ............................. 2003-086864

(51) Int. Cl.
*H04L 9/00* (2006.01)
(52) U.S. Cl. ............................. 713/183; 713/184
(58) Field of Classification Search .............. 713/184, 713/182–183
See application file for complete search history.

(56) References Cited

U.S. PATENT DOCUMENTS 6,571,336 B1 * 5/2003 Smith, Jr. ................... 713/184
7,133,868 B1 * 11/2006 Ruest et al. .................... 707/5
7,171,564 B2 * 1/2007 Kelley et al. ................ 713/183
2004/0255155 A1 * 12/2004 Stading ........................ 713/201

OTHER PUBLICATIONS

Mishima et al., What Is a "Strong Password" That Could Overcome Brute Force, published in *Nikkei Network Security*, vol. 2, Part 2, Aug. 25, 2002 (pp. 36-47).

* cited by examiner

*Primary Examiner*—Gilberto Barron, Jr.
*Assistant Examiner*—Samson B Lemma

(57) ABSTRACT

A password input table creating method for creating a password input table referred to when inputting a password in a computer includes a step of displaying on a display a creation table having multiple entry fields each of which is to be an input area for one character, a step of entering, in the entry field of the creation table, each of characters composing a password to be inputted into the computer through an interactive process, a step of creating a password input table by randomly entering possible characters to be used for a password in entry fields of the creation table which have no character inputted therein, and a step of outputting the created password input table.

14 Claims, 24 Drawing Sheets

FIG. 3

| PASSWORD CREATION/INPUT SCREEN |
|---|

PASSWORD
STRENGTH INPUT AREAS

[ 2 ] YEARS  [   ] DAYS

PASSWORD TO BE CREATED

```
Xodlkejg
BsvmRl6l
jyeH6?
mall1okL
CAappuc5
```

[ CREATE ]

FIG. 6

PASSWORD INPUT TABLE CREATING SCREEN

PASSWORD

CLEAR    EXECUTE                                        PRINT

FIG. 8

| PASSWORD INPUT TABLE CREATING SCREEN | | | | | | | | | | | | | | |
|---|---|---|---|---|---|---|---|---|---|---|---|---|---|---|

PASSWORD  | — = k d j f ; s d

[CLEAR]  [EXECUTE]                                         [PRINT]

|   |   |   |   |   |   |   |   |   |   |   |   |   |   |   |
|---|---|---|---|---|---|---|---|---|---|---|---|---|---|---|
|   | x |   | o |   | d |   | l |   | k |   | e |   | j |   | g |
|   |   |   |   |   |   |   |   |   |   |   |   |   |   |   |
|   |   |   |   |   |   |   |   |   |   |   |   |   |   |   |
|   |   |   |   |   |   |   |   |   |   |   |   |   |   |   |
| f | j | e | F | v |   |   |   |   |   |   |   |   |   |   |
| A |   |   |   |   |   |   |   | f |   |   |   |   |   | l |
| S |   |   |   |   |   |   | ; |   | j |   |   |   | — |   |
| D |   |   |   |   |   | s |   |   |   | d |   | = |   |   |
| G |   |   |   |   | d |   |   |   |   |   | k |   |   |   |

FIG. 9

PASSWORD INPUT TABLE CREATING SCREEN

PASSWORD [                    ]

[CLEAR]   [EXECUTE]                        [PRINT]

| F | 9 | J | S | u | ! | j | * | ∕ | Y | G | X | [ | g | o | } |
|---|---|---|---|---|---|---|---|---|---|---|---|---|---|---|---|
| ≦ | X | 3 | o | % | d | M | I | x | k | : | e | @ | j | Q | g |
| C | + | a | D | 1 | { | # | Γ | B | a | h | ? | n | 7 | p | > |
| A | 1 | q | W | = | 6 | H | r | . | ÷ | E | L | ) | z | 5 | % |
| & | J | y | 2 | ( | " | U | < | 0 | T | 6 | ∀ | s | ≫ | 8 | j |
| f | j | e | F | v | I | U | W | 4 | √ | m | ∈ | ~ | 9 | p | ∞ |
| A | ≠ | O | ∃ | 8 | Γ | R | c | · | f | a | O | 2 | V | @ | | |
| S | 6 | ± | ( | ∫∫ | i | 0 | b | ; | t | j | 7 | k | 4 | − | ; |
| D | x | O | t | K | ⊆ | 5 | s | g | Z | E | d | Q | = | r | Y |
| G | ] | q | ∫ | ≒ | H | d | x | T | u | ∴ | ( | k | C | Z | $ |

FIG. 10

| F | 9 | J | S | u | ! | j | * | ╱ | Y | G | X | 〔 | g | o | 〕 |
|---|---|---|---|---|---|---|---|---|---|---|---|---|---|---|---|
| ≦ | X | 3 | o | % | d | M | l | x | k | : | e | @ | j | Q | g |
| C | + | a | D | 1 | { | # | Γ | B | a | h | ? | n | 7 | p | > |
| A | 1 | q | W | = | 6 | H | r | . | ÷ | E | L | ) | z | 5 | % |
| & | J | y | 2 | ( | " | U | < | 0 | T | 6 | ∀ | s | ≫ | 8 | j |
| f | j | e | F | v | I | U | W | 4 | √ | m | ∈ | ~ | 9 | p | ∞ |
| A | ≠ | O | ∃ | 8 | Γ | R | c | · | f | a | O | 2 | V | @ | \| |
| S | 6 | ± | ( | ∫∫ | i | 0 | b | ; | t | j | 7 | k | 4 | − | ' |
| D | x | O | t | K | ⊆ | 5 | s | g | Z | E | d | Q | = | r | Y |
| G | 〕 | q | ∫ | ≒ | H | d | x | T | u | ∴ | ( | k | C | Z | $ |

FIG. 11

PASSWORD INPUT TABLE CREATING SCREEN

PASSWORD

TABLE SIZE    16 × 10 ▼

SIZE OF BACKGROUND IMAGE
SMALL ←――――→ LARGE

SHADING OF BACKGROUND IMAGE
LOW ←――――→ HIGH

SELECTION OF BACKGROUND IMAGE

BACKWARD BY ONE CHARACTER    EXECUTE    CLEAR

PRINT    END

FIG. 14

PASSWORD INPUT TABLE CREATING SCREEN

PASSWORD

TABLE SIZE  16 × 10

SELECTION OF BACKGROUND IMAGE

SIZE OF BACKGROUND IMAGE
SMALL ←→ LARGE

SHADING OF BACKGROUND IMAGE
LOW ←→ HIGH

BACKGROUND IMAGE SELECTION SCREEN

DELETES BACKGROUND IMAGE    CLOSE

PRINT                        END

FIG. 17

PASSWORD INPUT TABLE CREATING SCREEN

PASSWORD

TABLE SIZE  20 × 10

SIZE OF BACKGROUND IMAGE
SMALL ← → LARGE

SHADING OF BACKGROUND IMAGE
LOW ← → HIGH

SELECTION OF BACKGROUND IMAGE

BACKWARD BY ONE CHARACTER

EXECUTE

CLEAR

PRINT

END

FIG. 19

PASSWORD INPUT TABLE CREATING SCREEN

PASSWORD: [                    ]

TABLE SIZE: [20 × 10 ▼]

SIZE OF BACKGROUND IMAGE: SMALL ←——→ LARGE

SHADING OF BACKGROUND IMAGE: LOW ←——→ HIGH

[SELECTION OF BACKGROUND IMAGE]

[BACKWARD BY ONE CHARACTER]   [EXECUTE]   [CLEAR]

| A | t | > | o | 6 | V | Q | u | W | & | N | > | : | j | u | K | 4 | M | < | s |
|---|---|---|---|---|---|---|---|---|---|---|---|---|---|---|---|---|---|---|---|
| E | a | b | c | d | e | f | g | . | 3 | _ | f | % | ` | v | v | n | S | > | i |
| x | U | a | 1 | s | N | H | p | u | . | T | > | h | ] | G | & | < | \| | @ | d |
| } | y | v | $ | E | L | r | I | { | J | Z | C | ; | ~ | 4 | T | . | = | G | 5 |
| Q | X | v | d | ~ | p | b | # | * | H | % | @ | q | H | ! | < | q | C | ~ | z |
| s | K | R | n | e | ~ | ? | * | ~ | D | A | # | 9 | % | r | g | F | ~ | # | \| |
| & | - | y | v | p | ~ | ~ | ~ | ~ | R | 6 | x | < | # | w | ~ | : | f | f |   |
| X | e | w | J | e | ~ | ~ | Y | V | ~ | & | ◊ | s | B | ? | p | + | Q | ' |   |
| 0 | k | ? | O | 7 | V | * | m | < | P | " | ~ | ~ | ~ | & | % | t | y |   |   |
| : | m | X | o | { | g | D | ; | B | e | ¥ | B | Y | w | * | o | " | + | E | _ |

[PRINT]                                         [END]

FIG. 20

```
PASSWORD INPUT TABLE CREATING SCREEN

PASSWORD    [                              ]

TABLE SIZE  [ 16 × 10  ▼]

[ BLOCK    BLOCK SETTING   ALL BLOCK SETTING ]
    [ SETTING    RELEASE           RELEASE       ]

[BACKWARD BY ]  [EXECUTE]   [CLEAR]
    [ONE CHARACTER]

(16 × 10 grid)

[PRINT]                                    [END]
```

FIG. 23

PASSWORD INPUT TABLE CREATING SCREEN

PASSWORD [              ]

TABLE SIZE [ 20 × 10 ▼ ]

[ BLOCK SETTING ] [ BLOCK SETTING RELEASE ] [ ALL BLOCK SETTING RELEASE ]

[ BACKWARD BY ONE CHARACTER ] [ EXECUTE ] [ CLEAR ]

[ PRINT ] [ END ]

FIG. 24

PASSWORD INPUT TABLE CREATING SCREEN

PASSWORD [                    ]

TABLE SIZE [ 20 × 10 ▼ ]

[ BLOCK SETTING ] [ BLOCK SETTING RELEASE ] [ ALL BLOCK SETTING RELEASE ]

[ BACKWARD BY ONE CHARACTER ] [ EXECUTE ] [ CLEAR ]

| A | t | > | o | 6 | V | Q | u | W | & | N | > | : | j | u | K | 4 | M | < | s |
|---|---|---|---|---|---|---|---|---|---|---|---|---|---|---|---|---|---|---|---|
| E | a | b | c | d | e | f | g | . | 3 | _ | f | % | 、 | . | w | n | S | > | i |
| x | U | a | ■ | s | N | H | ■ | ■ | ■ | ■ | ] | G | & | ■ | | | @ | d |   |
| } | y | v | ■ | E | L | T | [ | { | ] | Z | C | ; | ⌒ | 4 | T | ■ | = | G | 5 |
| Q | X | v | ■ | I | p | b | # | * | H | % | @ | q | H | ! | < | ■ | O | ⌒ | z |
| s | K | R | ■ | e | " | ? | * | r | c | D | A | # | 9 | % | r | ■ | F | # | | |
| & | — | y | ■ | p | | | { | 2 | | | R | _ | 6 | x | < | # | w | ■ | : | f | f |
| X | e | w | ■ | e | P | 6 | ■ | ■ | ■ | ■ | s | 8 | ? | ■ | + | Q | ' |   |   |
| 0 | k | ? | O | 7 | V | * | m | < | P | " | ~ | o | | d | R | & | % | t | y |
| : | m | X | o | { | g | D | ; | B | e | ¥ | B | Y | w | * | o | " | + | E | _ |

[ PRINT ]                                    [ END ]

PASSWORD INPUT TABLE CREATING METHOD AND APPARATUS AND PROGRAM THEREOF

CROSS-REFERENCE TO RELATED APPLICATIONS

This application is a related application of a co-pending application, U.S. patent application Ser. No. 10/677,277, filed Oct. 3, 2003, claims the priorities based on Japanese Patent Applications No. 2849/2003 and No. 86864/2003, and is commonly assigned to the same assignee as the related applications, and which related and priority applications noted above are incorporated herein by reference.

BACKGROUND OF THE INVENTION

1. Field of the Invention

This invention relates to a password input table creating method and apparatus and a program thereof, and more particularly to a password input table creating method and apparatus for creating a password input table which is referred to when inputting a password into a computer, and a password input table creating program used to implement the password input table creating method.

2. Description of the Related Art

When a user utilizes a system operating on a computer, whether or not the user is the person authenticated to use the system is determined by having the user input the same password that has been registered with the computer in advance. Accordingly, in order to assure security, the user needs to use a robust password with little risk of being easily read by the others. Such a password can be realized by including therein special symbols that are not often used.

However, those passwords that can be realized by including therein special symbols that are not often used are robust but difficult to remember. Thus, using a robust password may cause a problem that a user cannot remember it when inputting it. With such a background, a robust password is not necessarily used in actual condition.

When a user must ensure a high security, he creates a robust password using a password generating tool which generates a random character string, writes down the password on paper, and inputs it into a computer referring to the note. However, writing down a password on paper is nothing but a worst deed, which will cause the essential advantage of a password for security to be lost completely.

SUMMARY OF THE INVENTION

An object of the present invention, which is from consideration of such condition, is to provide a password input table creating method enabling use of a robust password which is difficult for a user to remember by creating a password input table for showing the password in a form which is caught by only user himself/herself who inputs the password.

Another object of the present invention is to provide a password input table creating apparatus enabling use of a robust password which is difficult for a user to remember by creating a password input table for showing the password in a form readable only to the user inputting the password.

Another object of the present invention is to provide a password input table creating program enabling use of a robust password which is difficult for a user to remember by creating a password input table for showing the password in a form readable only to the user inputting the password.

The password input table creating method according to the present invention creates a password input table which is referred to when inputting a password into a computer. The password input table creating method includes the steps of displaying on a display a creation table having multiple entry fields each of which is to be an input area for one character, entering, in the entry field of the creation table, each of characters composing a password to be inputted into the computer through an interactive process, creating a password input table by randomly entering possible characters to be used for a password in entry fields of the creation table which have no character inputted therein, and outputting the created password input table.

The password input table creating apparatus according to the present invention creates a password input table which is referred to when inputting a password into a computer. The password input table creating apparatus includes display means for displaying on a display a creation table having multiple entry fields each of which is to be an input area for one character, entry means for entering each of characters (including numerics and symbols) composing a password to be inputted into the computer, in the entry field of the creation table to be displayed on a display, through an interactive process, means for creating a password input table by randomly entering possible characters (including numeric and symbols) to be used for a password in entry fields of the creation table to be displayed on a display which have no character inputted therein, and means for outputting the password input table created by the creation means.

In this configuration, the display means may display a creation table with a predetermined image presented thereon. In this case, one ore more of the size, shading, color attribute, arrangement location of the image to be presented on the creation table may be changed through an interactive process. A list of images presentable on a creation table may be displayed so that an image to be presented on the creation table may be selected therefrom through an interactive process.

Furthermore, in this configuration, the display means may display a creation table on which one or more entry-inhibited fields, where entry of a character is inhibited, are expressly presented. In this case, any field included in the entry fields may be set as an entry-inhibited field through an interactive process.

Each of the above processing means can be implemented in a computer program, which may be provided as recorded in a recording medium such as a semiconductor memory, or via a network.

In the password input table creating apparatus of the present invention configured as mentioned above, when a creation table having multiple entry fields each of which is to be an input area for one character is displayed on a display, a password input table is created by first entering, in the entry field of the creation table, each of characters composing a password to be inputted into the computer through an interactive process, and then randomly entering possible characters to be used for a password in entry fields of the creation table which have no character inputted therein. The created password input table is then outputted to paper, for example.

In this case, in order to prevent a trace of the inputted password from being left, characters are selected from characters, which are left after deleting the entered password characters from possible characters to be used for a password and entered in the entry fields of the creation table which have no character inputted therein first, and then, characters are selected from all the possible characters to be used for a passwords and entered in the remaining entry fields which have no character inputted therein, instead of immediately entering characters selected from all the possible characters to be used for a password in entry fields which have no character inputted therein.

In order to realize the process configuration, it is assumed to use a creation table provided with entry fields of the number larger than the sum of the number of characters used for the password to be processed and the number of characters left after deleting the characters used for the password to be processed from the possible characters to be used for a password.

In this way, the present invention enables creation of a password input table in which a password is displayed in a form readable only to the user inputting the password. Thus, according to the present invention, it is possible to use of a robust password which is difficult for a user to remember.

In this configuration, the password input table creating apparatus of the present invention may display a creation table with a predetermined image presented thereon when displaying on a display a creation table having multiple entry fields each of which is to be an input area for one character.

By using such a creation table with a predetermined image presented thereon, it is possible for a user to enter a password in the creation table in association with the characteristics of the image, for example, to enter a password in the creation table with a field, in which a portion of the image is located, used as a reference field. This enables the user to easily and surely remember the entry location of the password shown on the password input table.

In order to intensify the effect, there may be provided a function of enabling the size, shading, color attribute and arrangement location of the image presented on the creation table to be changed through an interactive process or a function of enabling selection of an image to be presented on the creation table from a list of images presentable on the creation table through an interactive process.

In this configuration, the password input table creating apparatus of the present invention may display on a display a creation table which expressly presents one or more entry-inhibited fields for which entry of a character is inhibited when displaying on a display a creation table having multiple entry fields each of which is to be an input area for one character.

By using such a creation table with entry-inhibited fields presented thereon, it is possible for a user to enter a password in the creation table in association with the entry-inhibited fields, for example, to enter a password in the creation table with any entry-inhibited field as a reference field. This enables the user to easily and surely remember the entry location of the password shown on the password input table.

In order to intensify the effect, there may be provided a function of setting any field included in the entry fields as an entry-inhibited field through an interactive process.

BRIEF DESCRIPTION OF THE DRAWINGS

FIG. 3 is an explanatory diagram of a password creation/input screen.

FIG. 6 is an explanatory diagram of a password input table creating screen.

FIG. 8 is an explanatory diagram of a password input table creating screen.

FIG. 9 is an explanatory diagram of a password input table creating screen.

FIG. 10 is an explanatory diagram of a password input table.

FIG. 11 is an explanatory diagram of a password input table creating screen.

FIG. 14 is an explanatory diagram of a background image selection screen.

FIG. 17 is an explanatory diagram of a password input table creating screen.

FIG. 19 is an explanatory diagram of a password input table creating screen.

FIG. 20 is an explanatory diagram of a password input table creating screen.

FIG. 23 is an explanatory diagram of a password input table creating program.

FIG. 24 is an explanatory diagram of a password input table creating program.

DETAILED DESCRIPTION OF THE PREFERRED EMBODIMENTS

Figure 1:
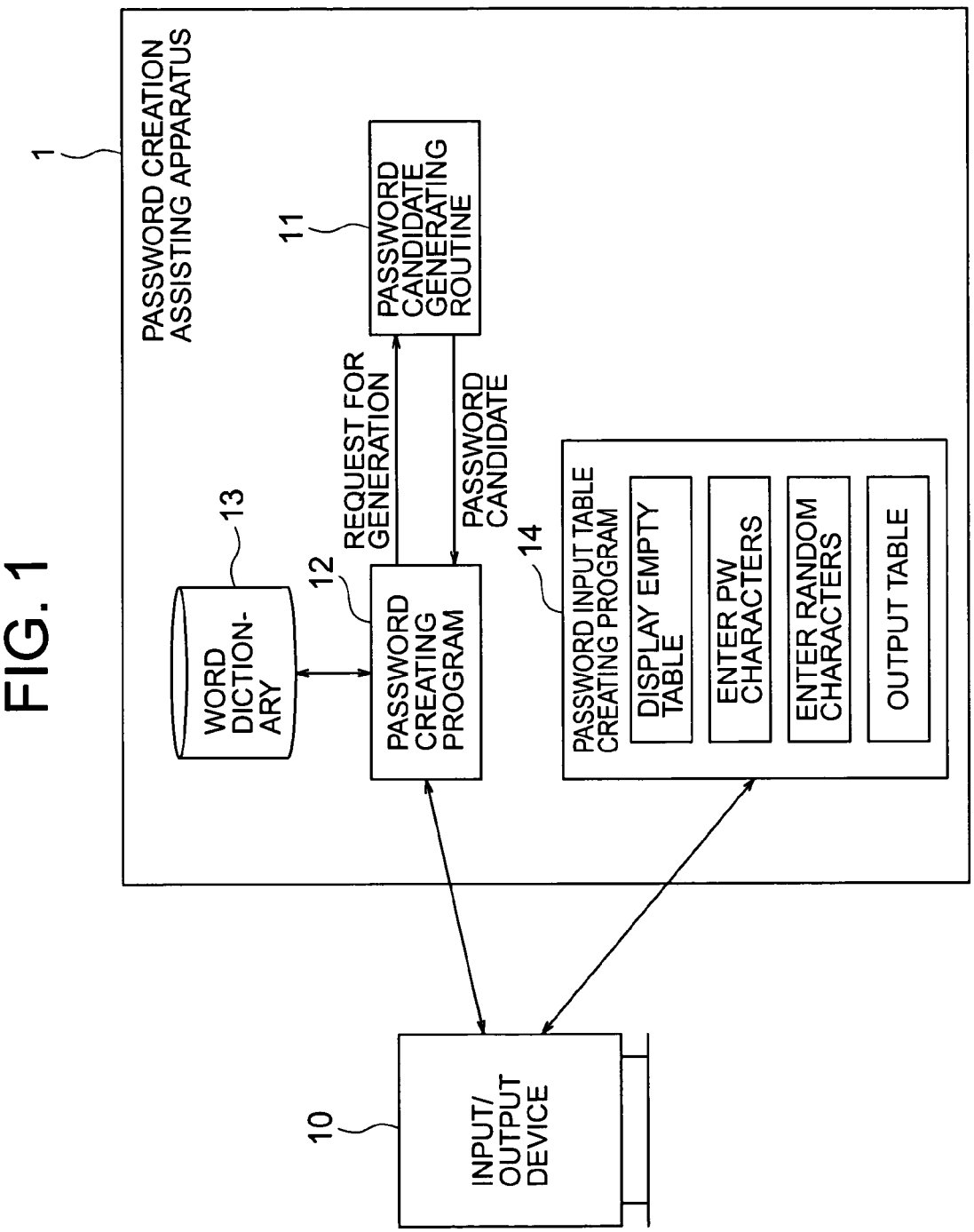
FIG. 1 shows an embodiment of the present invention.

The present invention is now described below according to an embodiment. FIG. 1 shows an embodiment of a password creation assisting apparatus 1 provided with the present invention.

The password creation assisting apparatus 1 creates a password with a specified strength and a password input table for showing a password in a form which is caught by only user himself/herself. The password creation assisting apparatus 1 includes an input/output device 10 as a means for interacting with a user, a password candidate generating routine 11 used by a password guessing tool such as "John the Ripper" to generate a plaintext password candidate, a password creating program 12 for using the password candidate generating routine 11 to create a password with a guaranteed strength, a word dictionary 13 for accumulating information of possible words to be used as a password, and a password input table creating program 14, prepared to implement the present invention, for creating a password input table displaying a password created by the password creating program 12, in a form which is caught by only user himself/herself.

The password input table creating program 14, which is prepared to implement the invention, is provided as recorded in a recording medium, such as a semiconductor memory, or via a network.

As seen from a process flow described later, the password input table creating program 14 has functions of displaying on a display an empty password input table having a grid composed of multiple fields (entry fields) each of which is to be an input area for one character, entering, in each field of the grid of the empty password input table, each of characters composing a password to be inputted into a computer through an interactive process, creating a password input table by randomly entering, in fields of the password input table which have no character inputted therein, possible characters to be used for a password, and outputting the created password input table.

The password candidate generating routine 11, which is used by a password guessing tool used for a brute force attack, generates more than 7 trillion plaintext password candidates in a predetermined order, for example, by first generating plaintext password candidates using character strings written in a dictionary and then generating plaintext password candidates using all possible character strings to be used as a password.

As disclosed in the above co-pending application filed Oct. 3, 2003, focusing attention on the point that a generation rank of a password candidate generated by a password guessing tool used for an brute force attack can be associated with a password strength, the password creating program 12 causes a user to input a password strength, and a generation rank associated with the inputted password strength is determined. And then, based on the generation rank, a password is created using a password guessing tool.

In other words, in a brute force attack, all possible characters to be used for a password are combined to generate plaintext password candidates, and judgment is repeatedly made about whether or not each of the encrypted plaintext password candidates match an encrypted password registered with a computer in order to steal the plaintext password associated with the encrypted password. And, accordingly, the password creating program 12, focusing attention on the point that a generation rank of a password candidate generated by a password guessing tool used for an brute force attack can be associated with a password strength, determines a generation rank associated with a password strength inputted by a user and creates a password based on the generation rank using a password guessing tool.

Figure 2:
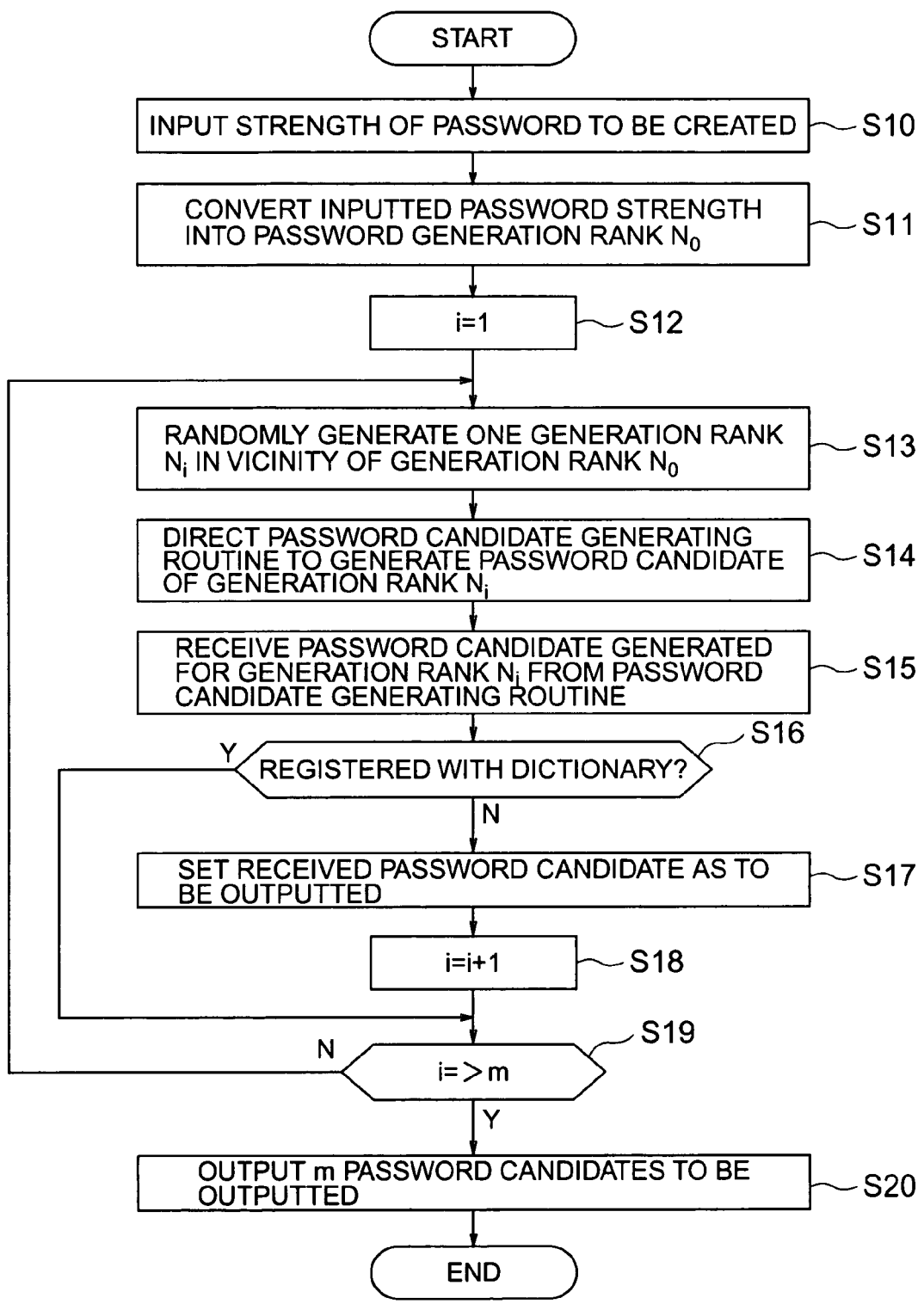
FIG. 2 shows a process flow executed by a password creating program.

A process executed by the password creating program 12 is now described according to the process flow shown in FIG. 2.

When a password creation/input screen provided with an input area for a password strength is shown on a display of the input/output device 10, and if a user inputs in the input area a time which is to be a password strength (time during which the password can endure a brute force attack) to issue a request for creation of a password, the password creating program 12 first inputs the time to be a password strength at the step S10, as shown in the process flow in FIG. 2.

Then, at the step S11, by dividing the inputted time by $\tau$, the inputted time is converted into a generation rank of a password candidate to be generated by the password candidate generating routine 11 (hereinafter, described as "N0").

Here, $\tau$ indicates a time required for generating and encrypting a password candidate and comparing it with an encrypted password to be brute-force attacked to determine whether or not they match each other.

Then, "1" is set for a "variable i" indicating the number of passwords to be generated. Then, at the step S13, a generation rank Ni is randomly generated in the vicinity of the generation rank N0. And, at the step S14, the password candidate generating routine 11 is directed to generate a password candidate for the generation rank Ni.

Receiving this direction, the password candidate generating routine 11 detects the location in generation procedure of the generation rank Ni, generates a password candidate thereof, and returns it to the password creating program 12.

Then, at the step S15, the password candidate generated for the generation rank Ni is received from the password candidate generating routine 11.

Then, at the step S16, it is judged whether or not the received password candidate is registered with the word dictionary 13. If it is judged that the received password candidate is not registered with the word dictionary 13, then the program 12 proceeds to step S17, where the received password candidate is set as to be outputted. Then, the program 12 proceeds to step S18, where the value of the variable i is incremented by one.

On the other hand, if it is judged that the received password candidate is registered with the word dictionary 13 at the step S16, then processing at the steps S17 and S18 is omitted because the password is not suitable for use as a password.

Then, at the step S19, it is judged whether or not the value of the variable i is larger than "m". If it is judged that the value of the variable i is not larger than "m", then the process returns to step S13 to perform processing for the next generation rank Ni. On the other hand, if it is judged that the value of the variable i is larger than "m", then the program 12 proceeds to step S20. At step S20, "m" password candidates set as to be outputted are outputted to the input/output device 10, and the process ends.

In this way, when a time, such as two years, is specified on a password creation/input screen as shown in FIG. 3 to issue a request for creation of a password, the password creating program 12 creates, for example, 10 password candidates which can endure a brute force attack for two years and outputs them to the password creation/input screen.

A password created in this way is robust against a brute force attack but difficult to remember because it includes special characters that are not often used.

To enable use of such a robust password that is difficult to remember, the password input table creating program 14 creates a password input table for showing a password in a form which is caught by only user himself/herself.

Figure 4:
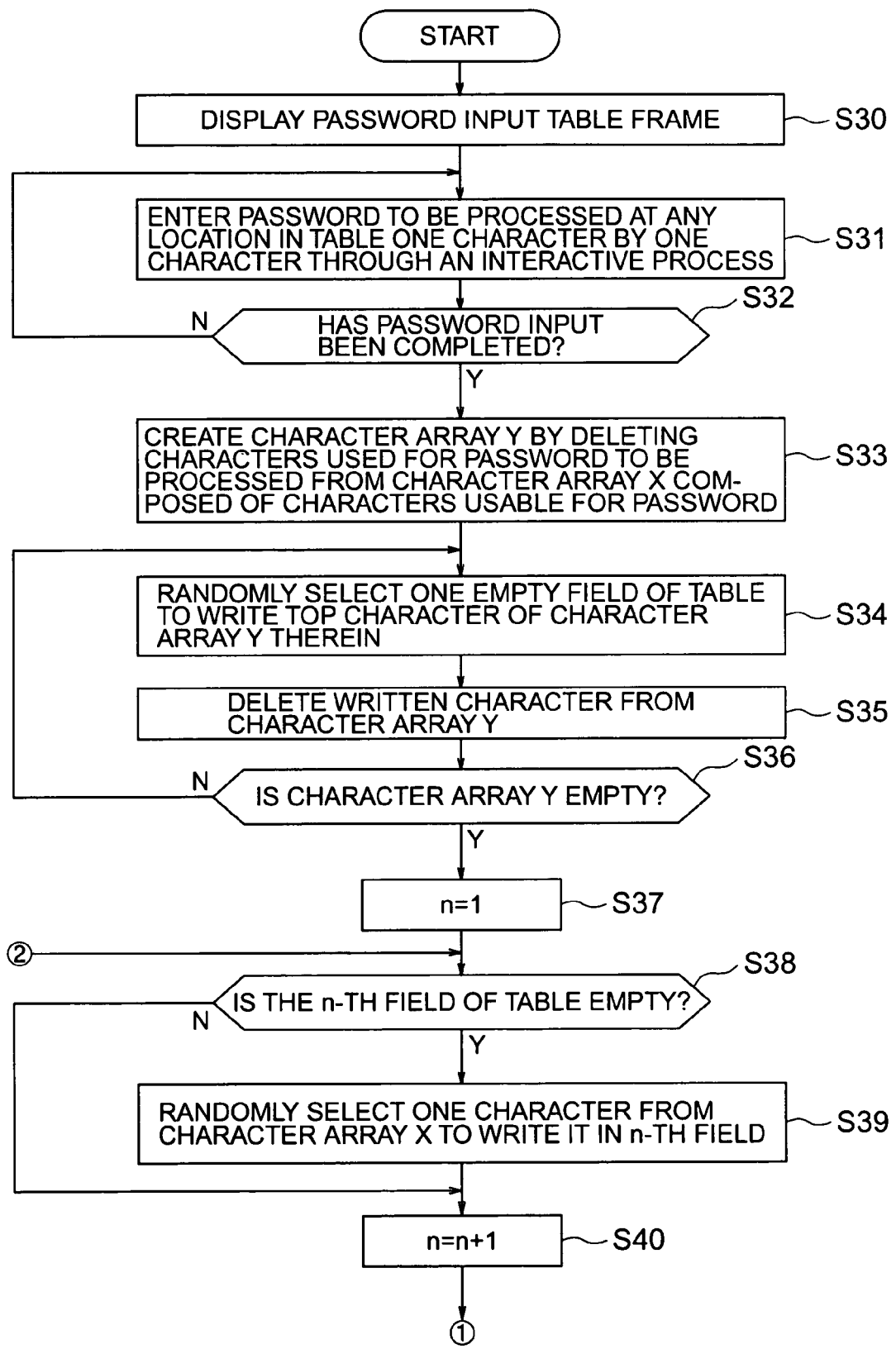
FIG. 4 shows a process flow executed by a password input table creating program.
Figure 5:
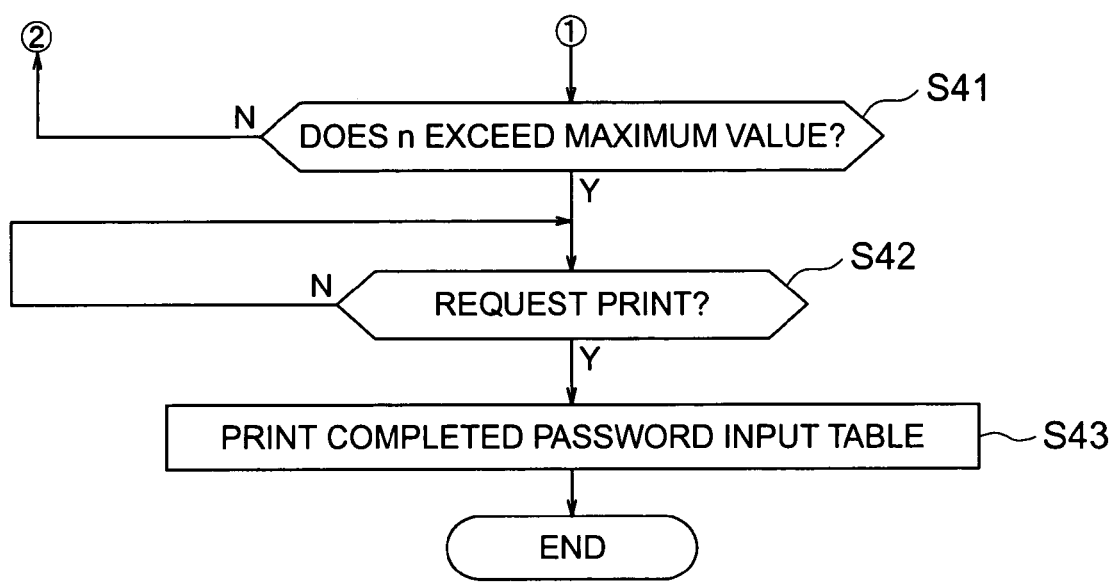
FIG. 5 shows a process flow executed by a password input table creating program.

A process executed by the password input table creating program 14 is now described in detail according to the process flow shown in FIGS. 4 and 5.

When a request for creation of a password input table is issued by a user via the input/output device 10, the password input table creating program 14, at the step S30, first displays a password input table creating screen as shown in FIG. 6 to present a password input table frame, which is provided with multiple fields each of which is to be an input area for one character, as shown in the process flow in FIGS. 4 and 5.

Then, at the step S31, each character of a password to be processed is written in any field of the password input table frame displayed on a display, through interaction with the user.

Figure 7:
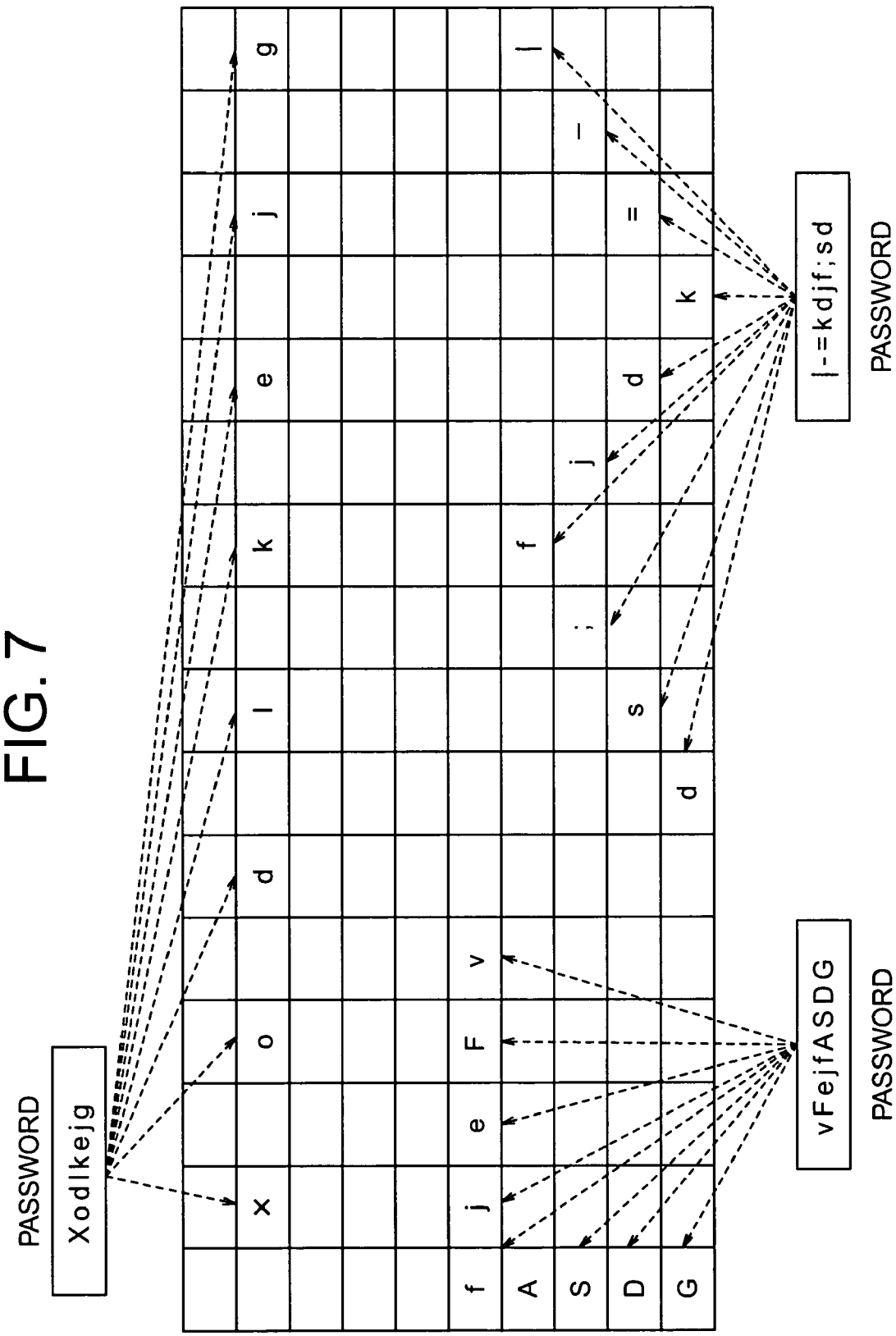
FIG. 7 is an explanatory diagram of a password input table creating screen.

When a password "Xodlkejg" is to be processed, for example, each of the characters composing the "Xodlkejg" is written in a field of the password input table frame displayed on the display, corresponding to the field location specified by the user, as shown in FIG. 7.

Then, at the step S32, it is judged whether or not a password input completion notification has been issued by the user. If it is judged that the password input completion notification has not been issued, then the process returns to step S31 to input the next password.

For example, when completing input of passwords after inputting multiple passwords, for example, inputting a password "Xodlkejg", then a password "vFejfASDG", and then a password "|=kdjf;sd" as shown in FIG. 7, the user operates "execution button" shown in FIG. 6. Thus, by detecting whether or not the "execution button" has been operated, it is judged whether or not a password input completion notification has been issued by the user.

In this way, the user operates the "execution button" shown in FIG. 8 to issue a password input completion notification after inputting three passwords, "Xodlkejg", "vFejfASDG", and "|=kdjf;sd" as shown in FIG. 8.

If it is judged that a password input completion notification has been issued by the user at the step S32, then, at the step S33, a character array Y is created by deleting characters used for a password to be processed from a character array X composed of characters which can be used for a password.

Suppose that three password of "Xodlkejg", "vFejfASDG", and "|=kdjf;sd" (27 characters in total, but 20 character kinds) are inputted, for example, and that 95 kinds of characters can be used for a password. In this case, the character array Y is created by deleting the 20 kinds of characters used for the three passwords from the character array X composed of 95 kinds of characters.

In this case, the number of fields of the password input table frame is preferably larger than the sum of the number of characters used for the inputted password and the number of characters left after deleting the characters used for the inputted password from the character array X, so that it is ensured that the characters in the character array X are to be entered in the fields at least once to, thereby preventing a trace of password from being left, though it was not described above.

For example, if there are provided possible 95 kinds of characters to be used for a password, and the number of characters and the number of character kinds used for a password to be inputted are assumed to be 27 and 20, respectively, then the number of fields of the password input table frame is preferably larger than 102 (=27+(95−20)). It is assumed hereinafter to use a password input table frame which satisfies this condition.

When the character array Y is created in this way, an empty field of the password input table frame is randomly selected, and the top character of the character array Y is written therein at the step S34. Then, at the step S35, the written character is deleted from the character array Y.

Then, at the step S36, it is judged whether or not the character array Y is empty due to the character deletion. If it is judged that the character array Y is not empty, then the process returns to step S34.

By repeating processing at the steps S34 to S36, the characters of the character array X are first written in the fields of the password input table frame at least once.

On the other hand, if it is judged that the character array Y is empty at the step S36, then the program 14 proceeds to step S37, where "1" indicating the top field is set for a "variable n" indicating a field location.

Then, at the step S38, it is judged whether or not the field indicated by the "variable n" is empty. If it is judged that the field indicated by the variable n is empty, then the program 14 proceeds to step S39, where a character is randomly selected from the character array X and written in the field indicated by the variable n. On the other hand, if it is judged that the field indicated by the variable n is not empty, then the processing at the step S39 is omitted.

Then, at the step S40, the value of the variable n is incremented by one. Then, at the step S41, it is judged whether or not the value of the variable n has exceeded the maximum value indicating the last field. If it is judged that this maximum value is not exceeded, then the process returns to step S38.

On the other hand, if it is judged that the value of the variable n has exceeded the maximum value indicating the last field, then the program 14 proceeds to step S42 to wait for a request for printing the password input table to be issued by the user. If the print request is detected, the program 14 proceeds to step S43. At step S43, the input/output device 10 is directed to print a completed password input table, and the process ends.

In other words, the user operates the "print button" shown in FIG. 9 when it is confirmed, by the value of the variable n exceeding the maximum value indicating the last field, that all the fields of the password input table are filled with characters, as shown in FIG. 9, and the input/output device 10 is directed to print a completed password input table, when it is detected that the "print button" is operated, and prints it.

In this way, the password input table creating program 14 prints a password input table as shown in FIG. 10, which shows a password at field locations specified by a user and random characters at field locations which are not specified by the user.

In the password input table created in this way, a password is displayed in a form which is caught by only user himself/herself who has input the password, so that the user can input the password into a computer by referring to the password input table.

To explain the example in FIG. 8, though the character string "Xodlkejg" is difficult to remember, it is relatively easy to remember information of the location where it is shown, "characters shown in every other field starting from the character in the second field from the top of the second line from the top of the frame". Thus, the user can remember a robust password formed with a complicated character string by referring to the printed password input table.

Thus, according to the present invention, it is possible to use a robust password which is difficult for a user to remember.

A process is now described in the case of using a password input table creating screen as shown in FIG. 11 instead of a password input table creating screen shown in FIG. 6.

For the password input table creating screen shown in FIG. 11, a black-and-white image is assumed to be used as a background image, which is described later, and there are provided a "background image selection button" used for selecting a background image composed of the black-and-white image, a "background image size adjustment scale" used for changing the size of the background image, and a "background image shading adjustment scale" used for changing shading of the background image.

Additionally, the password input table creating screen shown in FIG. 11 is provided with a "backward by one character button" and a "table size selection button", presentation of which was omitted in the password input table creating screen shown in FIG. 6.

After inputting a password in the password input area of the password input table creating screen shown in FIG. 6, a user selects fields of the password input table frame one by one with a mouse to write the inputted password in the fields of the password input table frame one character by one character.

In this case, the password input table creating program 14 deletes the password inputted in the password input area one character by one character as the password is written.

The "backward by one character button" shown in FIG. 11 is provided to cancel one character that has been written and re-display the deleted one character in the password input area.

The "table size selection button" shown in FIG. 11 is provided to select the size of the password input table frame (specify the number of fields).

Figure 12:
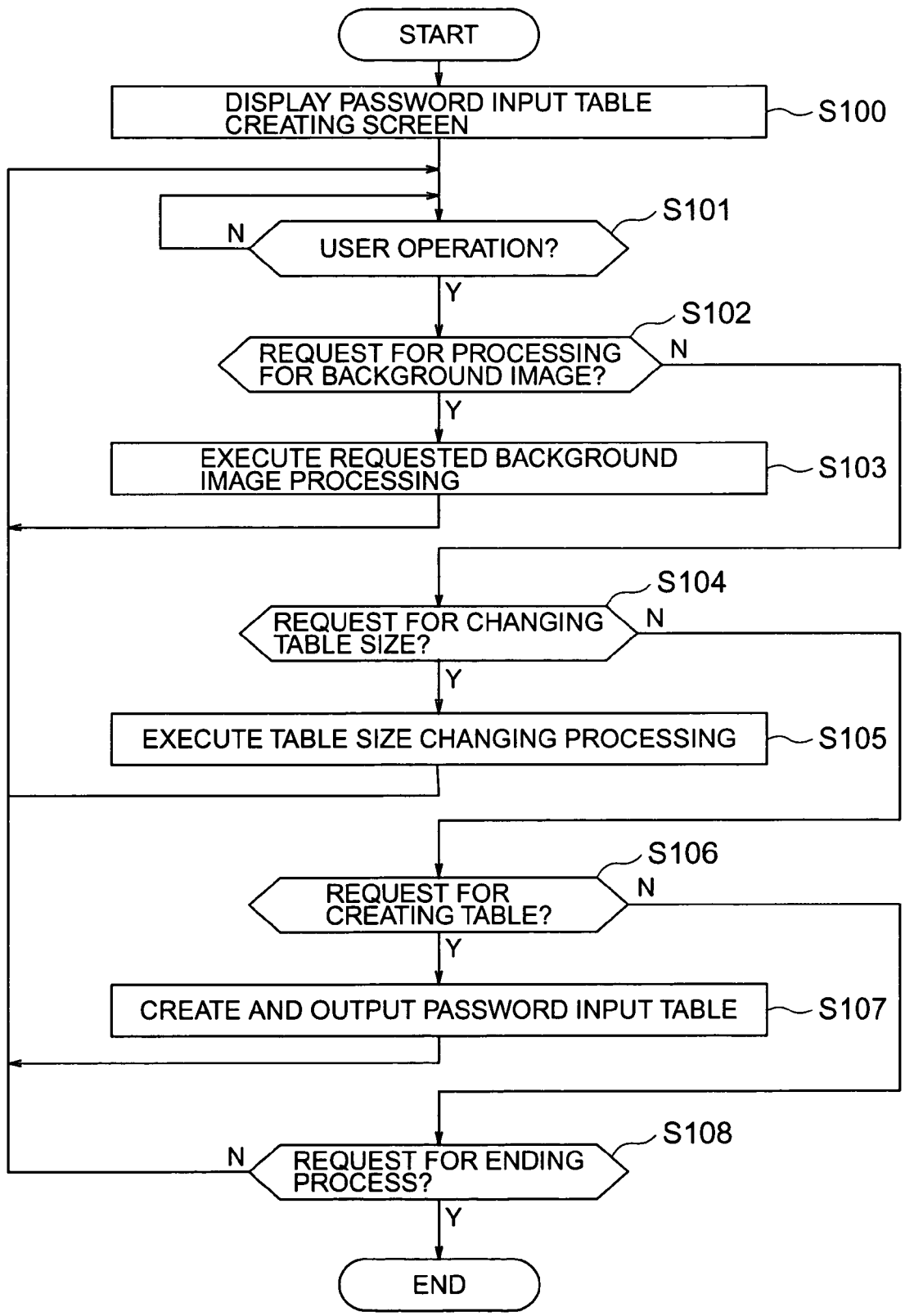
FIG. 12 shows a process flow executed by a password input table creating program.
Figure 13:
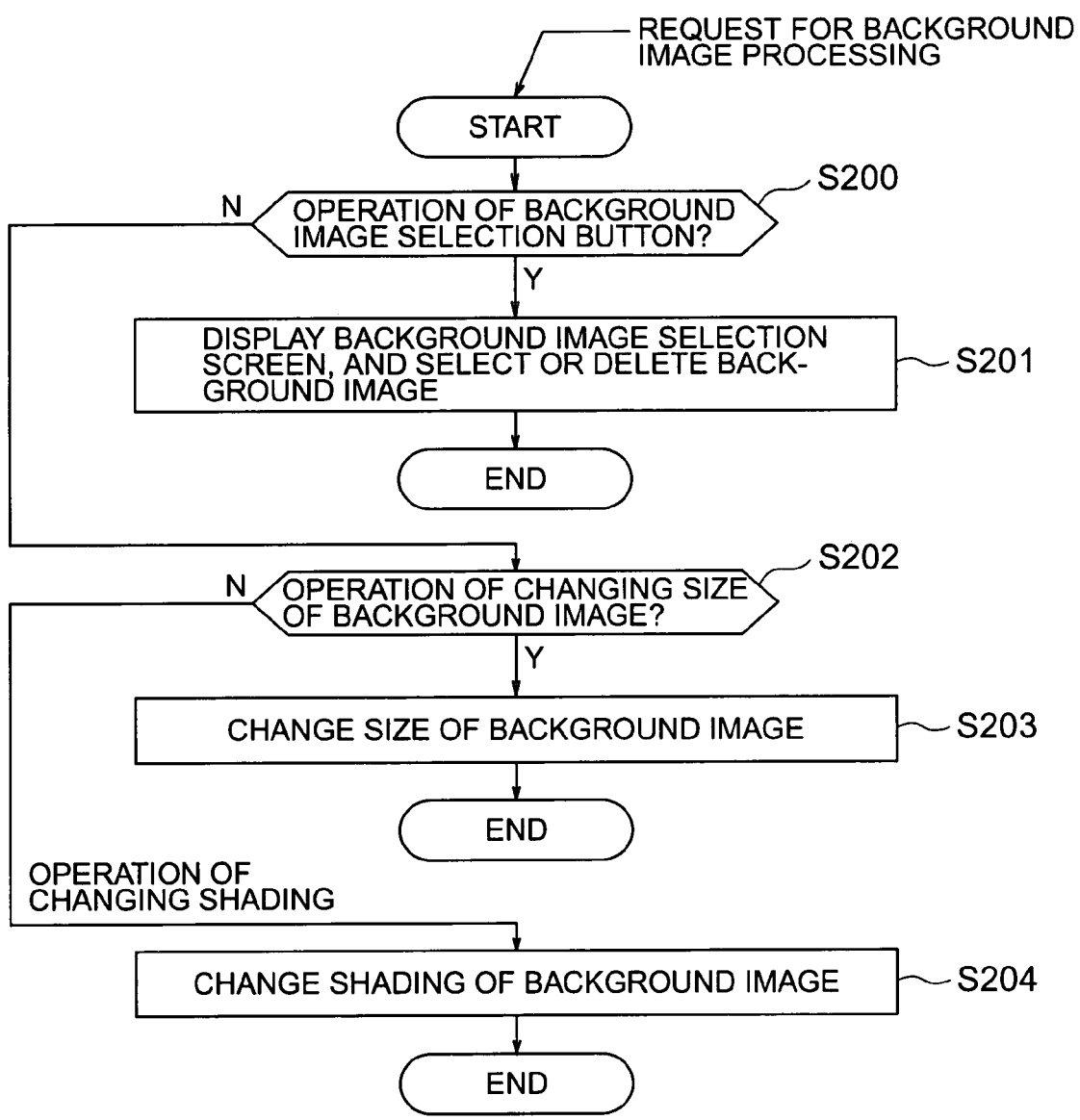
FIG. 13 shows a process flow executed by a password input table creating program.

FIGS. 12 and 13 show process flows to be executed by the password input table creating program 14 when the password input table creating screen shown in FIG. 11 is used.

A process in the case of using the password input table creating screen shown in FIG. 11 is now described according to the process flows.

When a request for creation of a password input table is issued by a user via the input/output device 10, the password input table creating program 14 first displays a password input table creating screen as shown in FIG. 11 on the display of the input/output device 10, at the step S100, to show a password input table frame having multiple fields each of which is to be an input area for one character, as shown in the process flow in FIG. 12.

Then, at the step S101, the program 14 waits for a user operation on the password input table creating screen, and proceeds to step S102 when detecting the operation by the user. At step S102, it is judged whether or not the user operation is an operation of a "background image selection button", a "background image size adjustment scale" or a "background image shading adjustment scale" to request processing for a background image. If it is judged that the user operation is a request for processing the background image, the program 14 proceeds to step S103 to execute the requested background image processing, and returns to step S101.

The executed processing for the background image is described later according to the process flow in FIG. 13.

On the other hand, at the step S102, if it is judged that the user operation is not a request for processing the background image, then the program 14 proceeds to step S104. At step S104, it is judged whether or not the user operation is an operation of the "table size selection button" to request changing the table size. If it is judged that the user operation is a request for changing the table size, then the program 14 proceeds to step S105. At step S105, the size of the password input table frame is changed from "16×10" to "20×10" according to the operation of the "table size selection button", for example, and the process returns to step S101.

On the other hand, if it is judged that the user operation is not a request for changing the table size at the step S104, then the program 14 proceeds to step S106. At step S106, it is judged whether or not the user operation is a request for creating a password input table. If it is judged that the user operation is a request for creating a password input table, then the program 14 proceeds to step S107. At step S107, a password input table is created and outputted according to the process described with reference to the process flow in FIGS. 4 and 5, and the process returns to step S101.

On the other hand, if it is judged that the user operation is not a request for creating a password input table at the step S106, then the program 14 proceeds to step S108. At step S108, it is judged whether or not the user operation is an operation of the "end button" shown in FIG. 11 to request ending of the process. If it is judged that the user operation is not a request for ending the process, then the process returns to step S101. If it is judged that the user operation is a request for ending the process, then the process ends.

A process for a background image executed at the step S103 is now described according to the process flow in FIG. 13.

If it is judged that the user operation is a request for processing for the background image, then the password input table creating program 14 first determines whether or not the user has operated the "background image selection button" at the step S200, as shown in the process flow in FIG. 13.

If it is judged that the user has operated the "background image selection button" based on the judgment, the program 14 proceeds to step S201. At step S201, a background image selection screen (provided with a "background delete button") is displayed which shows a list of selectable background images as shown in FIG. 14. Based on detection of a user operation on the background image selection screen, a background image to be displayed on the password input table creating screen is selected or the background image already displayed is deleted, and the process for the background image ends.

Figure 15:
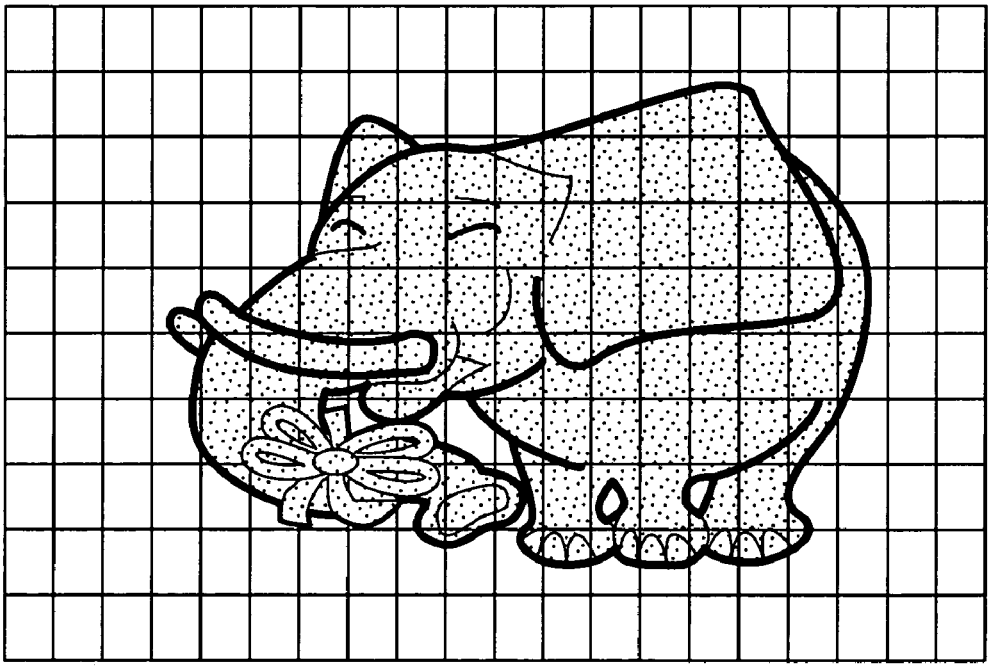
FIG. 15 is an explanatory diagram of a password input table creating screen.

When an "elephant" image is selected at the background image selection screen, for example, the selected "elephant" image is displayed as a background image in a manner that it is fit in the password input table frame, as shown in FIG. 15.

On the other hand, if it is judged that the user has not operated the "background image selection button" at the step S200, then the program 14 proceeds to step S202. At step S202, it is judged whether or not the user has operated the "background image size adjustment scale".

If it is judged that the user has operated the "background image size adjustment scale" on the judgment, then the program 14 proceeds to step S203. At step S203, the background image displayed on the password input table creating screen is enlarged or reduced depending on the operation, and the process for the background image ends.

Figure 16:
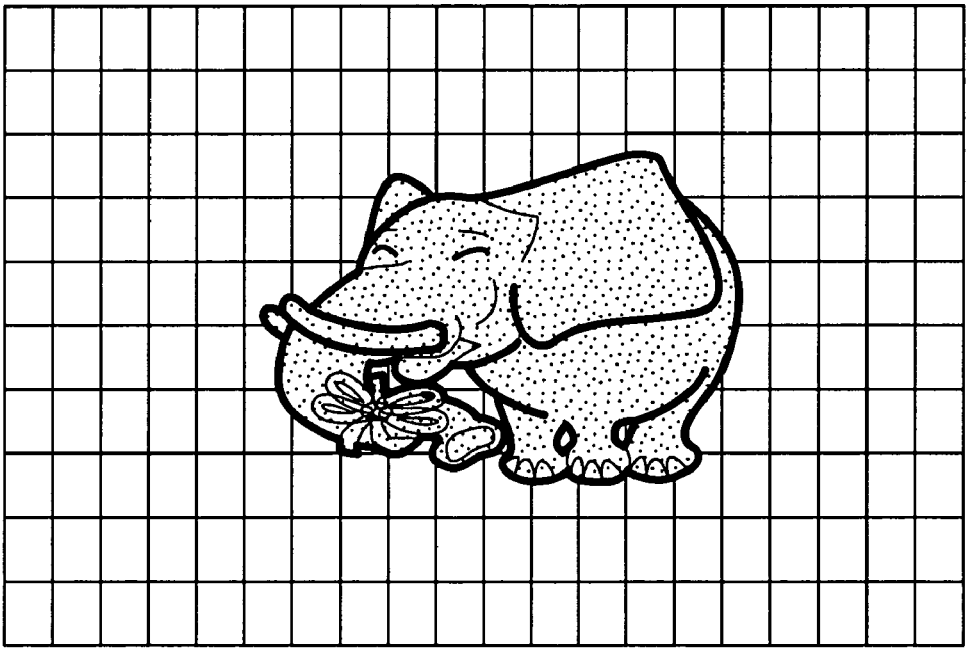
FIG. 16 is an explanatory diagram of a password input table creating screen.

For example, when an "elephant" image as shown in FIG. 15 is displayed on the password input table creating screen as a background image, and if the user operates the "background image size adjustment scale" to request reduction of the size of the "elephant" image, then the size of the "elephant" image is reduced according to a user operation, as shown in FIG. 16.

On the other hand, if it is judged that the user has not operated the "background image size adjustment scale" at the step S202, that is, that the user has operated the "background image shading adjustment scale", then the process program 14 to step S204. At step S204, the shading of the background image displayed on the password input table creating screen is changed according to a user operation, and the process for the background image ends.

Figure 18:
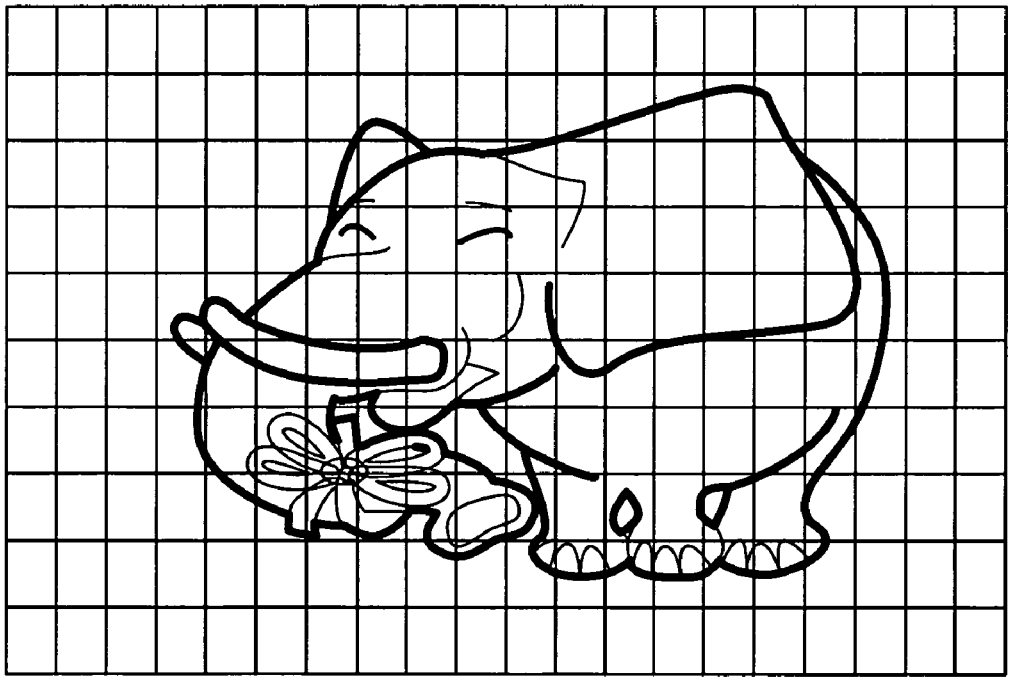
FIG. 18 is an explanatory diagram of a password input table creating screen.

For example, when an "elephant" image as shown in FIG. 15 is displayed on the password input table creating screen as a background image, and if the user operates the "background image shading adjustment scale" to request the "elephant" image to be darkened, the "elephant" is darkened according to a user operation, as shown in FIG. 17. On the other hand, it is requested to lighten the "elephant" image, the "elephant" image is lightened according to a user operation, as shown in FIG. 18.

In response to display of the password input table creating screen showing such a background image, a user interacts with the password input table creating program 14 to input a password into a password input area of the password input table creating screen and, by selecting fields of the password input table frame one by one using a mouse, writes the inputted password in the fields of the password input table frame one character by one character. In response to this, the password input table creating program 14 enters random characters in fields which have not been specified by the user to create a password input table, as shown in FIG. 19.

By using the password input table creating screen which shows such a background image, a user can enter a password in association with the characteristics of the background image. For example, a password can be entered every other field on the right side with the eye of the "elephant" as a starting point. Thus, it is possible to easily and surely remember the entry location of the password shown on a printed password input table.

The function of selecting a background image through interaction with a user is provided for the password input table creating program 14 for the purpose of enabling selection of background image characteristics which are easy for a user to remember.

The function of changing the size of a background image through interaction with a user is provided for the password input table creating program 14 for the purpose of enabling arrangement of background image characteristics, which the user wants to use, in fields in a suitable form. To realize arrangement in a suitable form, the password input table creating program 14 may be provided with a function of changing the location, where the background image is presented, through interaction with the user.

The function of changing shading of a background image through interaction with a user is provided for the password input table creating program 14 for the purpose of creating a password input table enabling a user to easily read a password therefrom. Thus, the password input table creating program 14 may be provided with a function of changing color or lightness (shading in the case of a black-and-white image) when a color background image is used.

A process is now described in the case of using a password input table creating screen as shown in FIG. 20 instead of the password input table creating screen shown in FIG. 6.

The password input table creating screen shown in FIG. 20 is provided with a "block setting button" for setting a character-entry-inhibited field for which entry of a character is inhibited, a "block setting release button" for releasing the setting of a character-entry-inhibited field, and an "all block setting release button" for releasing the setting of all entry-inhibited fields.

Figure 21:
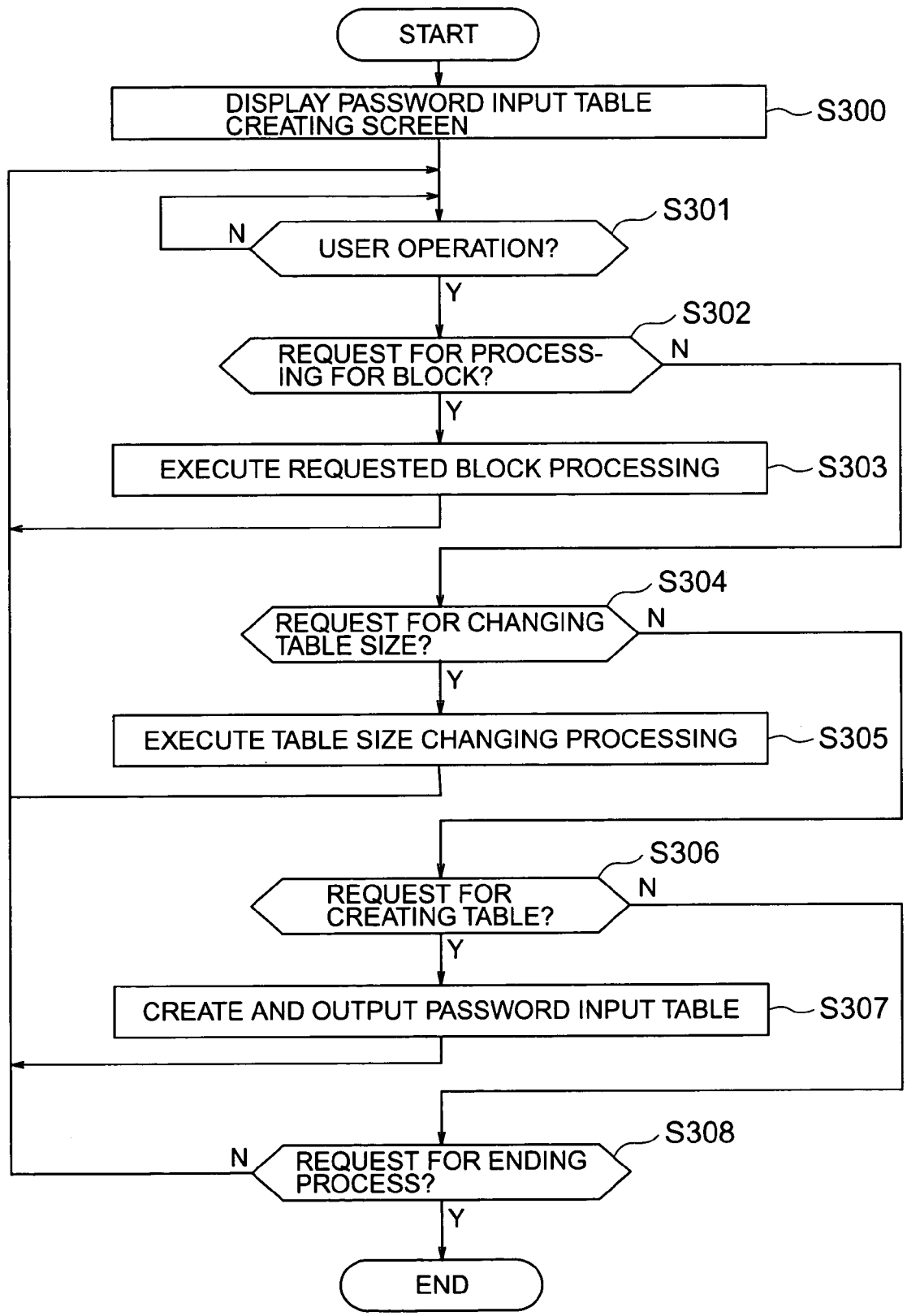
FIG. 21 shows a process flow executed by a password input table creating program.
Figure 22:
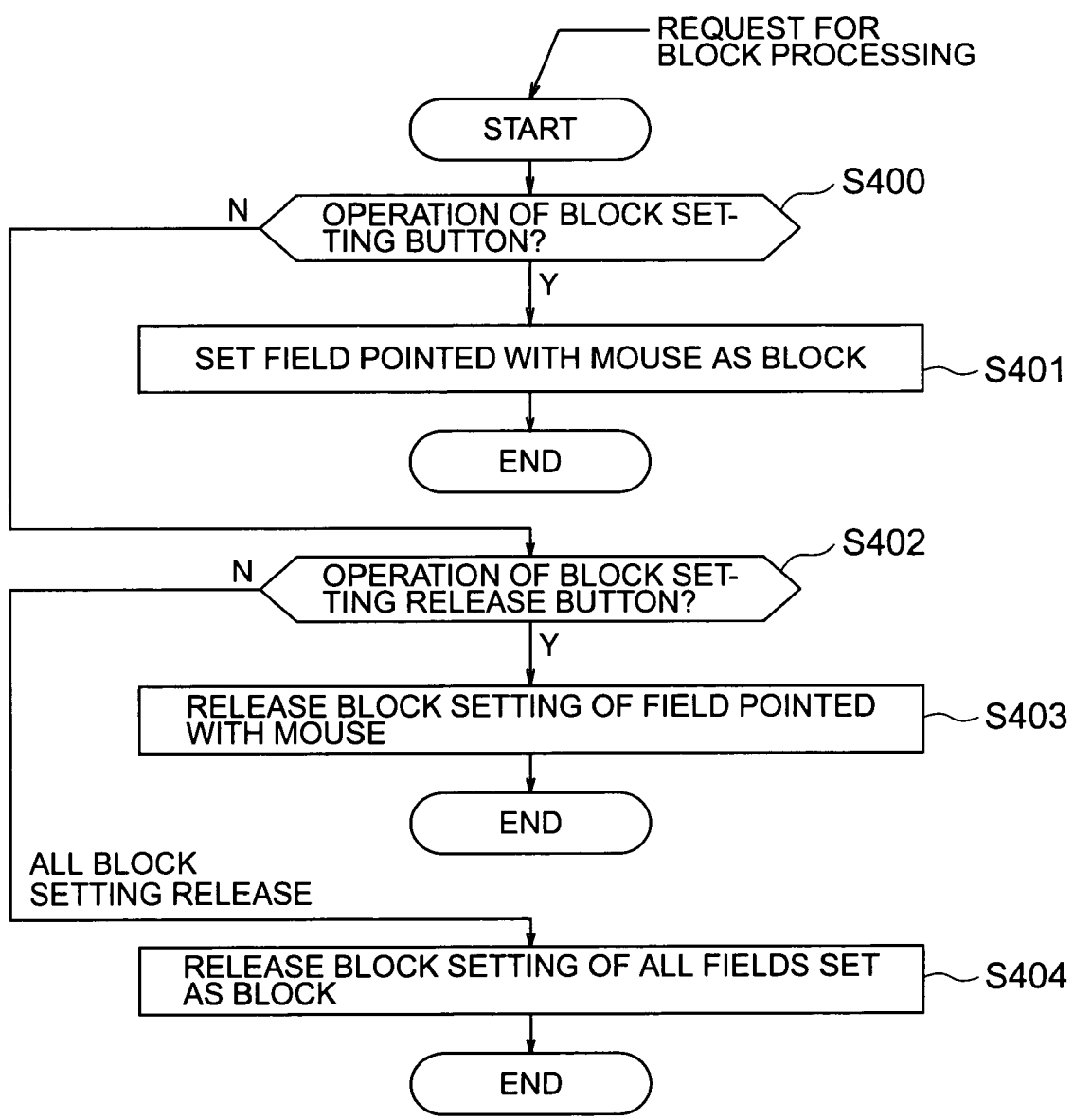
FIG. 22 shows a process flow executed by a password input table creating program.

FIGS. 21 and 22 show process flows to be executed by the password input table creating program 14 when the password input table creating screen shown in FIG. 20 is used.

A process in the case of using the password input table shown in FIG. 20 is now described according to the process flows.

When a request for creation of a password input table is issued by a user via the input/output device 10, the password input table creating program 14 first displays, on the display of the input/output device 10, a password input table creating screen as shown in FIG. 20 to present a password input table frame having multiple fields each of which is to be an input area for one character at the step S300, as shown in the process flow in FIG. 21.

Then, at the step S301, the program 14 waits for a user operation on the password input table creating screen, and proceeds to step S302 when detecting a user operation. At step S302, it is judged whether or not the user operation is an operation of a "block setting button", a "block setting release button" or an "all block setting release button" to request processing for a block. If it is judged that the user operation is a request for processing the block, the program 14 proceeds to step S303 to execute the requested block processing, and then returns to step S301.

The executed processing for the block is described later according to the process flow in FIG. 22.

On the other hand, at the step S302, if it is judged that the user operation is not a request for processing the background image, then the program 14 proceeds to step S304. At step S304, it is judged whether or not the user operation is an operation of the "table size selection button" to request changing the table size. If it is judged that the user operation is a request for changing the table size, then the program 14 proceeds to step S305. At step S305, the size of the password input table frame is changed from "16×10" to "20×10" according to an operation of "table size selection button", for example, and the program 14 returns to step S301.

On the other hand, if it is judged that the user operation is not a request for changing the table size at the step S304, then the program 14 proceeds to step S306. At step S306, it is judged whether or not the user operation is a request for creating a password input table. If it is judged that the user operation is a request for creating a password input table, then the program 14 proceeds to step S307. At step S307, a password input table is created and outputted according to the process described with reference to the process flow in FIGS. 4 and 5, and the program 14 returns to step S301.

On the other hand, if it is judged that the user operation is not a request for creating a password input table at the step S306, then the program 14 proceeds to step S308. At step S308, it is judged whether or not the user operation is an operation of the "end button" shown in FIG. 20 to request ending of the process. If it is judged that the user operation is not a request for ending the process, then the program 14 returns to step S301. If it is judged that the user operation is a request for ending the process, then the process ends.

A process for a block executed at the step S303 is now described according to the process flow in FIG. 22.

If it is judged that the user operation is a request for processing for the block, then the password input table creating program 14 first determines whether or not the user has operated the "block selection button" at the step S400, as shown in the process flow in FIG. 22.

If it is judged that the user has operated the "block setting button" based on the judgment, the program 14 proceeds to step S401. At step S401, a field pointed with a mouse is set as a block defined as a character-entry-inhibited field (when set as a block, the field is expressly displayed in such a manner that it can be recognized as a block) and the process for the block ends.

For example, the field pointed with the mouse is set as a character-entry-inhibited block and painted black to indicate to that effect, as shown in FIG. 23. Though blocks are formed like islands in FIG. 23, it is, of course, possible to set a block composed of only one field which is not connected with other blocks.

On the other hand, if it is judged that the user has not operated the "block setting button" at the step S400, then the program 14 proceeds to step S402, where it is judged whether or not the user has operated the "block setting release button".

If it is judged that the user has operated the "block setting release button" on the judgment, then the program 14 proceeds to step S403. At step S403, the field set as a block, which is pointed with the mouse, is released from the block setting, and the process for the block ends.

On the other hand, if it is judged that the user has not operated the "block setting release button", that is, the user has operated the "all block setting release button" at the step S402, then the program 14 proceeds to step S404. At step S404, all the fields set as a block are released from the block setting, and the process for blocks ends.

In this way, the password input table creating program 14 sets any field included in the password input table creating screen as a block according to a user's instruction to set a block in a form as shown in FIG. 23, for example.

In response to display of the password input table creating screen showing such blocks, a user interacts with the password input table creating program 14 to input a password into a password input area of the password input table creating screen and, by selecting fields of the password input table frame other than blocks one by one using a mouse, writes the inputted password in the fields of the password input table frame other than blocks one character by one character. In response to this, the password input table creating program 14 shows random characters in fields which have not been specified by the user to create a password input table, as shown in FIG. 24.

By using the password input table creating screen which shows such blocks, a user can enter a password in association with the blocks. For example, a password can be entered between the left island and right island and in contact with the upper island. Thus, it is possible to easily and surely remember the entry location of the password shown on a printed password input table.

Furthermore, the user can set a block in any form. Accordingly, the effect is further intensified by setting a block in a form easy to remember.

Although the present invention has been described according to the embodiments shown in the figures, it is not limited thereto. For example, though it was explained that a password input table is printed in the embodiments, it is also possible to employ an output form such as a file data to be outputted to a floppy disk and the like. Furthermore, though a rectangular frame was shown as a password input table frame used for entering a password in the embodiments, the form is not limited to a rectangle.

As described above, the present invention enables creation of a password input table in which a password is displayed in a form which is caught by only user who inputs the password. The present invention also enables the user to easily and surely remember where in the password input table his password is shown when creating the password input table. Thus, according to the present invention, it is possible to use a robust password which is difficult for a user to remember.

What is claimed is:

1. A password input table creating method for creating a password input table referred to when inputting a password in a computer, the method comprising:

displaying on a display a creation table having multiple entry fields each of which is to be an input area for one character;

entering, in the entry field of the creation table, each of characters composing a password to be inputted into the computer through an interactive process;

creating a password input table by randomly entering possible characters to be used for a password in entry fields of the creation table which have no character inputted therein; and outputting the created password input table, wherein the creating first enters, in the entry fields of the creation table which have no character inputted therein, characters selected from characters left after deleting characters of the entered password characters from possible characters to be used for a password, and then enters, in the remaining entry fields which have no character inputted therein, characters selected from all the possible characters to be used for a password, and wherein the displaying displays, as the creation table, a creation table having more entry fields than the sum of the number of characters used for the password to be processed and the number of characters left after deleting the characters used for the password to be processed from the possible characters to be used for a password.

2. The password input table creating method according to claim 1, wherein the displaying displays, as the creation table, a creation table on which a predetermined image is presented.

3. The password input table creating method according to claim 1, further comprising:

changing one or more of size, shading, color attribute and arrangement location of the image presented on the creation table through an interactive process.

4. The password input table creating method according to claim 1, further comprising:

displaying a list of images presentable on the creation table for selection of an image to be presented on the creation table through an interactive process.

5. The password input table creating method according to claim 1, wherein the displaying displays, as the creation table, a creation table which expressly presents one or more entry-inhibited fields for which entry of a character is inhibited.

6. The password input table creating method according to claim 5, further comprising:

setting any field included in the entry fields as the entry-inhibited field through an interactive process.

7. A password input table creating apparatus for creating a password input table referred to when inputting a password into a computer, the apparatus comprising:

means for displaying on a display a creation table having multiple entry fields each of which is to be an input area for one character;

means for entering, in the entry field of the creation table, each of characters composing a password to be inputted into the computer through an interactive process;

means for creating a password input table by randomly entering possible characters to be used for a password in entry fields of the creation table which have no character inputted therein; and means for outputting the created password input table, wherein the means for creating first enters, in the entry fields of the creation table which have no character inputted therein, characters selected from characters left after deleting characters of the entered password characters from possible characters to be used for a password, and then enters, in the remaining entry fields which have no character inputted therein, characters selected from all the possible characters to be used for a password, and wherein the means for displaying displays, as the creation table, a creation table having more entry fields than the sum of the number of characters used for the password to be processed and the number of characters left after deleting the characters used for the password to be processed from the possible characters to be used for a password.

8. The password input table creating apparatus according to claim 7, wherein the displaying means displays, as the creation table, a creation table on which a predetermined image is presented.

9. The password input table creating apparatus according to claim 7, wherein the displaying means displays, as the creation table, a creation table which expressly presents one or more entry-inhibited fields for which entry of a character is inhibited.

10. A computer readable storage medium storing a program used to implement a password input table creating method for creating a password input table referred to when inputting a password into a computer, wherein the password input table creating program causes a computer to perform:
   displaying on a display a creation table having multiple entry fields each of which is to be an input area for one character;
   entering, in the entry field of the creation table, each of characters composing a password to be inputted into the computer through an interactive process;
   creating a password input table by randomly entering possible characters to be used for a password in entry fields of the creation table which have no character inputted therein; and
   outputting the created password input tablet,
   wherein the creating first enters, in the entry fields of the creation table which have no character inputted therein, characters selected from characters left after deleting characters of the entered password characters from possible characters to be used for a password, and then enters, in the remaining entry fields which have no character inputted therein, characters selected from all the possible characters to be used for a password, and
   wherein the displaying displays, as the creation table, a creation table having more entry fields than the sum of the number of characters used for the password to be processed and the number of characters left after deleting the characters used for the Password to be processed from the possible characters to be used for a password.

11. The computer readable storage medium according to claim 10, wherein the displaying displays, as the creation table, a creation table on which a predetermined image is presented.

12. The computer readable storage medium according to claim 10, wherein the displaying displays, as the creation table, a creation table which expressly presents one or more entry-inhibited fields for which entry of a character is inhibited.

13. The password input table creating method according to claim 3, further comprising:
   displaying a list of images presentable on the creation table for selection of an image to be presented on the creation table through an interactive process.

14. The password input table creating method according to claim 1, wherein the displaying displays, as the creation table, a creation table which expressly presents one or more entry-inhibited fields for which entry of a character is inhibited.

* * * * *

UNITED STATES PATENT AND TRADEMARK OFFICE
CERTIFICATE OF CORRECTION

PATENT NO. : 7,386,731 B2  Page 1 of 1
APPLICATION NO. : 10/750844
DATED : June 10, 2008
INVENTOR(S) : Daiji Sanai et al.

It is certified that error appears in the above-identified patent and that said Letters Patent is hereby corrected as shown below:

Column 15, Line 32, change "tablet," to --table,--.

Column 16, Line 11, change "Password" to --password--.

Signed and Sealed this

Eleventh Day of November, 2008

JON W. DUDAS
*Director of the United States Patent and Trademark Office*